(12) United States Patent
Schmelzle et al.

(10) Patent No.: US 7,947,241 B2
(45) Date of Patent: May 24, 2011

(54) AQUEOUS SOLUTION FOR THE TREATMENT OF EXHAUST GASES OF DIESEL ENGINES

(75) Inventors: Pierre Schmelzle, Saint Julien Molin Molette (FR); Leire Oro-Urrea, Lyons (FR); Stéphanie Escoffier, Pierre-Benite (FR); Françoise Douce, Vourles (FR)

(73) Assignee: Total Raffinage Marketing, Puteaux (FR)

( * ) Notice: Subject to any disclaimer, the term of this patent is extended or adjusted under 35 U.S.C. 154(b) by 0 days.

(21) Appl. No.: 12/528,069

(22) PCT Filed: Feb. 14, 2008

(86) PCT No.: PCT/FR2008/000186
§ 371 (c)(1),
(2), (4) Date: Aug. 20, 1999

(87) PCT Pub. No.: WO2008/125745
PCT Pub. Date: Oct. 23, 2008

(65) Prior Publication Data
US 2010/0015022 A1  Jan. 21, 2010

(30) Foreign Application Priority Data
Feb. 23, 2007 (FR) ..................... 07 01305

(51) Int. Cl.
*B01D 53/56* (2006.01)
(52) U.S. Cl. ........... 423/239.1; 252/182.11; 252/182.12; 252/182.18; 252/182.23; 252/182.29; 252/182.34; 252/183.11; 252/183.12; 252/183.14

(58) Field of Classification Search ............... 423/239.1; 252/182.11, 182.12, 182.18, 182.23, 182.29, 252/182.34, 183.12, 183.14
See application file for complete search history.

(56) References Cited

U.S. PATENT DOCUMENTS

| | | |
|---|---|---|
| 4,695,411 A | 9/1987 | Stern et al. |
| 4,920,691 A | 5/1990 | Fainman |
| 5,389,113 A | 2/1995 | Demmering et al. |
| 5,489,419 A | 2/1996 | Diep et al. |
| 5,645,756 A | 7/1997 | Dubin et al. |
| 6,017,369 A | 1/2000 | Ahmed |
| 6,550,250 B2 * | 4/2003 | Mikkelsen et al. ............. 60/685 |
| 6,878,359 B1 | 4/2005 | Mathes et al. |
| 2005/0160663 A1 | 7/2005 | Valentine |
| 2005/0262759 A1 | 12/2005 | Tort et al. |
| 2006/0213118 A1 | 9/2006 | Mittelbach et al. |
| 2008/0295394 A1 | 12/2008 | Furuta et al. |

FOREIGN PATENT DOCUMENTS

| | | |
|---|---|---|
| DE | 40 40 317 | 6/1992 |
| EP | 0 860 494 | 8/1998 |
| EP | 1 484 385 | 12/2004 |
| FR | 2 498 622 | 7/1982 |
| GB | 2 090 612 | 7/1982 |
| GB | 2 099 449 | 12/1982 |
| WO | WO 96/28380 | 9/1996 |
| WO | WO 00/75643 | 12/2000 |
| WO | WO 2005/010130 | 2/2005 |

* cited by examiner

*Primary Examiner* — Timothy C Vanoy
(74) *Attorney, Agent, or Firm* — Harness, Dickey & Pierce, P.L.C.

(57) ABSTRACT

The present application relates to the use of a solution for the treatment of exhaust gases at the outlet of on-board or stationary diesel engines. It also relates to its use in any device for the treatment of these exhaust gases, regardless of whether the engines are engines of heavy goods vehicles or engines for light vehicles or also engines for stationary industrial engine applications.

22 Claims, No Drawings

AQUEOUS SOLUTION FOR THE TREATMENT OF EXHAUST GASES OF DIESEL ENGINES

CROSS-REFERENCE TO RELATED APPLICATIONS

This application is a National Phase Entry of International Application No. PCT/FR2008/000186, filed on Feb. 14, 2008, which claims priority to French Patent Application No. 0701305, filed on Feb. 23, 2007, both of which are incorporated by reference herein.

TECHNICAL FIELD

The present invention relates to a solution for the treatment of exhaust gases at the outlet of on-board or stationary diesel engines. It also relates to its use in any device for the treatment of these exhaust gases, regardless of whether the engines are heavy goods vehicle engines or engines for light vehicles or also engines for stationary industrial engine applications.

BACKGROUND

The European standards relating to diesel fuel pollution, in particular those applicable to heavy goods vehicles, have made it possible to bring influence to bear on an effective and significant reduction in emissions which are harmful to the environment. Firstly, with phases EURO2 and EURO3, the combustion parameters of these engines for heavy goods vehicles have been modified. Phase EURO 4 has resulted in the manufacturers of heavy goods vehicle engines choosing after-treatment for exhaust gases, i.e. SCR (Selective Catalytic Reducer), EGR (Exhaust Gas Recirculation) and particle filters (PF). These various after-treatments can be installed on their own or in combination, inasmuch as that they do not always act on the same pollutants present in the exhaust gases.

The majority of European manufacturers of heavy goods vehicle engines have opted for SCR after-treatment for their engines' exhausts, this after-treatment acting exclusively on the reduction of nitrogen oxides present in the gases, another advantage of this technique being that it allows a significant reduction in fuel consumption by optimum engine adjustments. The SCR after-treatment consists of reducing the NOx or nitrogen oxides on a catalyst containing platinum and palladium, and in the presence of gaseous ammonia. In order to introduce gaseous ammonia into the exhaust, it is known to produce it directly in the pipe before the SCR by vaporizing an aqueous urea solution which, placed at an average temperature generally fluctuating from 200 to 400° C., decomposes progressively to gaseous ammonia.

In certain installation configurations for the SCR and for the injection of urea, the manufacturers have noted the appearance of deposits in exhaust pipes before the inlet to the SCR. These deposits can be sufficiently large to give rise to a partial or even total blockage of the exhaust pipe, thus causing a loss of engine power. At a constant injection configuration, the quantity of deposits formed is greater at low temperatures than at high temperatures. According to the analyses which have been carried out, the major part of these deposits is constituted of cyanuric acid, resulting from incomplete decomposition of the urea. This cyanuric acid can sublimate and produce gaseous ammonia again; this reaction can only take place at a very high temperature, greater than 450° C., a temperature rarely reached at this location in exhaust pipes.

Moreover, it has been noted that these deposits were present in pipes having bends due to lack of space in the vehicle, and where the distance separating the injection of urea and the first bend is too short. The assumption is that in this type of configuration, a part of the urea droplets does not have time to vaporize and fully decompose to gaseous ammonia. They are deposited on the wall of the pipe, which is at a temperature too "cold" to allow complete decomposition to gaseous ammonia, and they decompose only partially, forming deposits of cyanuric acid which adhere to the wall.

U.S. Pat. No. 5,489,419 describes a process for reducing the pollutants generated during combustion, more particularly NOx, by selective non-catalytic reduction (SNCR), using a Nox-reducing agent, generally urea, in aqueous solution. In order to increase the reliability of introducing the urea solution into the combustion chamber, D1 proposes to add a surfactant to the aqueous solution of urea in order to obtain a spray of urea in which the average size of the droplets is reduced and their distribution is more restricted than a spray of urea without surfactant. U.S. Pat. No. 5,645,756 proposes to improve the reliability of apparatus in contact with aqueous solutions of urea, prepared with water having a hardness which is not negligible, due to the presence of calcium, magnesium, carbonate ions etc. (cf. col. 3, lines 13-49). To solve this technical problem, D2 proposes to add to the aqueous solutions of urea a compound in order to suppress the hardness of the water, chosen from water-soluble phosphonates.

WO 00/75643 describes a method for monitoring the quantity of a urea solution used in a system intended to reduce the NOx, in particular in a combustion process with selective catalytic reduction (SCR). This method consists of incorporating a fluorescent tracer in the urea solution and monitoring the development the signal as a function of time, this fluorescent tracer moreover being capable of having surfactant properties. No document of the prior art mentions the formation of deposits, apart from particular documents which propose new injector structures for these solutions in order to avoid such the formation of deposits, without specifying their nature.

SUMMARY

The present invention therefore proposes the use of an aqueous solution comprising as a majority part, a constituent capable of releasing gaseous ammonia above 200° C. and as a minority part, at least one multi-functional additive, the HLB of which varies from 7 to 17, in order to limit the formation of deposits based on cyanuric acid in any spray device intended for the after-treatment of exhaust gases, more particularly SCR devices. The aqueous solution contains a compound capable of decomposing to gaseous ammonia which vaporizes easily on injection and which significantly limits the deposits of cyanuric acid on the "cold" walls. Moreover, the use of this solution can be implemented in any spray device intended for the after-treatment of exhaust gases.

According to a preferred embodiment, the solution comprises 15 to 40% at least of one constituent which decomposes to gaseous ammonia and more than 10 ppm, preferably more than 100 ppm of at least one multi-functional additive. According to a preferred embodiment, the solution comprises 100 to 5000 ppm of at least one multi-functional additive, preferably 500 to 1000 ppm. According to a preferred embodiment, said constituent is chosen from urea and its derivatives.

According to a preferred embodiment, the multi-functional additive is chosen from water-soluble neutral, ionic and amphoteric surfactants. According to a preferred embodiment, the additives composed of neutral surfactants are chosen from linear alkoxylated and polyalkoxylated alcohols, alkoxylated and polyalkoxylated alkylphenols, polyalkoxylated fatty acid esters, amine and amide derivatives, alkylene oxide homopolymers and copolymers, preferably ethylene oxide and propylene oxide, alkoxylated and polyalkoxylated polyalcohols, alone or in a mixture. According to a preferred embodiment, the additives composed of ionic surfactants are chosen from linear alkylamines and alkylammoniums, linear diamines, aromatic or saturated heterocycles containing one or more nitrogen atoms, cyclic compounds of the imidazole type, etheramines and etheramides, oxyamines and ethoxyamines, alone or in a mixture. According to a preferred embodiment, the additives composed of amphoteric surfactants are chosen from amino acids and their imide or amide derivatives, alone or in a mixture.

According to a preferred embodiment, the additives are chosen from polyalkoxylated linear or branched fatty alcohols comprising carbonated chains with 3 to 40 carbon atoms and 5 to 10 alkoxylated units and having an HLB varying from 10 to 15, and polyalkoxylated fatty acid esters comprising 1 to 40 alkoxylated units per ester chain and having an HLB varying from 8 to 14. According to a preferred embodiment, the polyalkoxylated alcohols have ethoxylated and/or propoxylated groups. According to a preferred embodiment, the polyalkoxylated fatty acid esters are obtained from carbonated-chain C5-C24 fatty acids with polyols comprising from 1 to 5 OH, and at least one alkylene oxide. According to a preferred embodiment, the polyalkoxylated fatty acid esters are polyalkoxylated glycol and/or glycerol fatty acid esters. According to a preferred embodiment, the polyalkoxylated fatty acid esters are polyethoxylated and/or propoxylated fatty acid esters.

According to a preferred embodiment, in addition to antifoaming agents (alcohols, alkenes combined with one or more non-ionic surfactants, etc.), the solution comprises cosolvents intended to promote the dissolution of the surfactant or surfactants in the aqueous solution. According to another subject, the invention relates to a SCR process for aftertreatment of exhaust gases, comprising vaporization at a temperature comprised between 200 and 400° C. of an aqueous solution comprising as a majority part, a constituent capable of releasing gaseous ammonia above 200° C. and as a minority part, at least one multi-functional additive, the HLB of which varies from 7 to 17. Preferably, in the process according to the invention, the aqueous solution is as defined previously.

DETAILED DESCRIPTION

The subject of the present invention is therefore the use of an aqueous solution for limiting the formation of deposits based on cyanuric acid in any spray device intended for the after-treatment of exhaust gases comprising as a majority part, a component capable of releasing gaseous ammonia by increasing the temperature and as a minority part, at least one surfactant compound of which the HLB varies from 7 to 17. By HLB is meant the hydrophile/lipophile balance of said additive used. This aqueous solution is particularly advantageous in that, the droplets of solution being better dispersed due to its wettability characteristics and improved surface tension with respect to the solutions of the prior art, they vaporize and decompose more easily in gaseous ammonia before reaching the "cold" wall.

According to a preferred embodiment of the invention, the solution comprises 15 to 40% of at least one constituent which decomposes to gaseous ammonia and more than 10 ppm, preferably more than 100 ppm advantageously of at least one multi-functional additive. In order to obtain satisfactory efficiency, for example a reduction of more than at least 50% in the deposits, the solution comprises 100 to 5000 ppm, and advantageously 500 to 1000 ppm, of at least one multi-functional additive. Within the framework of the present invention, said constituent is chosen from urea and its derivatives.

In order to obtain a reduction in deposits, the multi-functional additive is preferably chosen from water-soluble ionic and amphoteric, neutral or non-ionic, surfactants. The additive composed of at least one neutral or non-ionic surfactant is chosen from alkoxylated and polyalkoxylated linear alcohols, alkoxylated and polyalkoxylated alkylphenols, polyalkoxylated fatty acid esters, amine and amide derivatives, alkylene oxide homopolymers and copolymers, preferably ethylene oxide and propylene oxide, alkoxylated and polyalkoxylated polyalcohols, alone or in a mixture. The additive composed of at least one ionic surfactant (cationic or anionic) is chosen from linear alkylamines and alkylammoniums, linear diamines, aromatic or saturated heterocycles containing one or more nitrogen atoms, cyclic compounds of imidazole type, etheramines and etheramides, oxyamines and ethoxyamines, alone or in a mixture.

The additive composed of at least one amphoteric surfactant is chosen from amino acids and their imide or amide derivatives, alone or in a mixture. In a preferred form of the invention, the additive is chosen from non-ionic surfactants and, advantageously, from polyalkoxylated linear or branched fatty alcohols comprising carbonated chains with 3 to 40 carbon atoms and 5 to 10 alkoxylated units and having an HLB varying from 10 to 15, and polyalkoxylated fatty acid esters comprising 1 to 40 alkoxy units per ester chain and having an HLB varying from 8 to 14. Preferably, the polyalkoxylated alcohols have ethoxylated and/or propoxylated groups.

More particularly, the additive is chosen from the polyalkoxylated fatty acid esters obtained from carbonated-chain C5-C24 fatty acids with polyols comprising from 1 to 5 OH, and at least one alkylene oxide. The scope of the invention would not be exceeded if in order to obtain these esters, alkylene oxides were reacted with vegetable or animal oils, for example rapeseed, sunflower, palm, soya, pine oils or animal fat. Among the polyalkoxylated fatty acid esters, polyalkoxylated glycol and/or glycerol fatty acid esters are preferred, these being more particularly polyethoxylated and/or propoxylated esters.

The aqueous solution can contain one or more additives other than the multi-functional additives as defined above, such as for example anti-foaming agents (alcohols, alkenes combined with one or more non-ionic surfactants, etc.), cosolvents intended to promote the dissolution of the surfactant or surfactants in the aqueous solution. The aqueous solution is prepared in the usual manner by mixing its constituents, preferably at ambient temperature, typically within a temperature range generally from 10 to 60° C. Water-soluble multi-functional additives, more particularly at ambient temperature, are generally preferred.

For reasons of speed of mixing of the constituents of the aqueous solution, it is preferable to avoid pasty and/or solid components. Preferably, the aqueous solutions comply with standard ISO 2241-1 as regards the quantities given in Table 1 of said standard: aldehydes, insoluble matter, phosphate, calcium, iron, copper, zinc, chromium, nickel, aluminum, sodium, potassium, and generally do not contain any element and/or component in a quantity such that it is capable of being an SCR catalyst poison. An embodiment of the invention is the use of the aqueous solution in any spray device intended for the after-treatment of exhaust gases, more particularly SCR devices.

The examples below are given as an illustration of the features of the invention but do not to restrict its scope.

EXAMPLE I

The present example aims to show the influence of the addition of an additive, and of its concentration, on the reduction of deposits on cold walls.

Aqueous solutions referenced Si, containing urea at 32.5% in water and increasing concentrations of additives B to T were prepared: they are described in Table I below.

B is a polyethoxylated fatty alcohol comprising 7.5 ethoxylated groups on a carbonated chain of 27 carbons, HLB equal to 13.5, sold by CECA S.A.

C is a polyethoxylated triglyceride comprising 30 ethoxylated units for an HLB of 12. It is pasty at ambient temperature and requires heating to 40° C. before being placed in solution in aqueous medium.

D is a mixture of alcohols, alkenes and non-ionic surfactants.

E is a mixture of amines, dimethyl C12-18 alkyls and N-oxides.

F is sodium octane-1-sulphonate monohydrate.

G is a mixture of polyethylene glycol, polypropylene glycol, monobutylic ether. It is very pasty at ambient temperature.

H is a mixture of ethoxylated and propoxylated C10-12 alcohols.

I is a coconut diethanolamide.

J is a mixture of alkyl phosphate, octane-1-ol, and decane-1-ol.

K is a mixture of phosphoric acid, butyl ester and potassium salt.

L is sodium dioctyl sulphosuccinate.

M is ethoxylated castor oil containing 20 ethoxylated units, with an HLB equal to 10.

N is an ethoxylated triglyceride containing 30 ethoxylated units, with an HLB equal to 11.8.

O is ethoxylated castor oil containing 40 ethoxylated units, with an HLB equal to 13. It is pasty at ambient temperature.

P is a mixture of ethoxylated C12-C14 alcohols containing 10 ethoxylated units, with an HLB equal to 11.3.

Q is an ethoxylated canola oil containing 30 ethoxylated units, with an HLB equal to 11.3.

R is an ethoxylated triglyceride containing 60 ethoxylated units. It is pasty at ambient temperature.

S is an aliphatic polyether with acid groups.

T is a mixture of copolymer, ethoxylated maleate alcohol and alpha-olefins.

TABLE I

| | Aqueous solution | | | | | | |
|---|---|---|---|---|---|---|---|
| | $S_0$ | $S_1$ | $S_2$ | $S_3$ | $S_4$ | $S_5$ | $S_6$ |
| Surfactant B to T (ppm) | 0 | 10 | 50 | 100 | 500 | 1000 | 5000 |

These aqueous solutions of urea, with or without the addition of additives, are used on an engine in bench tests representative of an urban use (bus or domestic waste collection vehicle) under optimized temperature conditions for promoting the production of deposits. Temperatures comprised between 250 and 320° C. are assumed.

The observed reductions in deposits due to the presence of additives are summarized in Table II below.

TABLE II

Reduction (in %) in deposits with tested additives (alone and in mixtures)

| | Aqueous solution | | | | | | |
|---|---|---|---|---|---|---|---|
| | $S_0$ | $S_1$ | $S_2$ | $S_3$ | $S_4$ | $S_5$ | $S_6$ |
| | Additive Concentration (ppm) | | | | | | |
| | 0 | 10 | 50 | 100 | 500 | 1000 | 5000 |
| B | | | | 50 | 75 | 80 | 85 |
| C | | | | — | 69 | 79 | — |
| D | | | | — | 55 | 58 | — |
| E | | | | — | — | 13 | — |
| F | | | | — | — | 21 | — |
| G | | | | — | — | 61 | — |
| H | | | | — | — | 46 | — |
| I | | | | — | — | 46 | — |
| J | | | | — | — | 46 | — |
| K | | | | — | — | 32 | — |
| L | | | | — | — | 64 | — |
| M + 150 ppm D | | | | — | 63 | — | — |
| N + 150 ppm D | | | | — | 63 | — | — |
| O + 150 ppm D | | | | — | 55 | — | — |
| P + 150 ppm D | | | | — | 72 | — | — |
| Q | | | | — | 49 | 53 | — |
| R + 150 ppm D | | | | — | 54 | | |
| S + 150 ppm D | | | | — | 24 | — | — |
| T + 150 ppm D | | | | — | 29 | — | — |

It is noted that the use of a multi-functional additive according to the invention makes it possible to reduce deposits in all cases with greater or lesser effectiveness. Certain additives make it possible to attain very low levels of deposits (up to 80% reduction in the deposit).

For the examples summarized in Table II, it is noted that the deposits are reduced by more than 50% once the additive content is greater than or equal to 100 ppm. Further, at a concentration of 1000 ppm, it is noted that the concentration is reached at which the effectiveness of the additive is optimum.

EXAMPLE II

The present example describes the effect of the addition of additives on the surface tension of the droplets of the aqueous solution.

The results of the surface tension values measured for the different solutions Si are given in mN/m (milliNewton/meter) in Table III below.

TABLE III

| | Aqueous solution | | | | | | |
|---|---|---|---|---|---|---|---|
| | $S_0$ | $S_1$ | $S_2$ | $S_3$ | $S_4$ | $S_5$ | $S_6$ |
| | Additive Concentration (ppm) | | | | | | |
| | 0 | 10 | 50 | 100 | 500 | 1000 | 5000 |
| B | 73.3 | 59.0 | 48.7 | 39.1 | 27.2 | 26.1 | 26.6 |
| C | 73.3 | 49.1 | 53.4 | 49.3 | 46.6 | 45.4 | — |
| D | 73.3 | 66.1 | 53.3 | 43 | 38.7 | 34.3 | 33.3 |
| E | 73.3 | — | — | — | 44.2 | 57.7 | — |
| F | 73.3 | — | — | — | 69.1 | 51.9 | — |
| G | 73.3 | — | — | — | 41 | 40.3 | — |
| H | 73.3 | — | — | — | 32.9 | 33.6 | — |
| I | 73.3 | — | — | — | 49.8 | 49.7 | — |
| J | 73.3 | — | — | — | 24.6 | 24.3 | — |
| K | 73.3 | — | — | — | 65.8 | 65.3 | — |
| L | 73.3 | — | — | — | 37.4 | 32.6 | — |

TABLE III-continued

| | Aqueous solution | | | | | | |
|---|---|---|---|---|---|---|---|
| | $S_0$ | $S_1$ | $S_2$ | $S_3$ | $S_4$ | $S_5$ | $S_6$ |
| | Additive Concentration (ppm) | | | | | | |
| | 0 | 10 | 50 | 100 | 500 | 1000 | 5000 |
| M | 73.3 | — | — | — | 43.2 | 42.4 | — |
| N | 73.3 | — | — | — | 43.4 | 42.3 | — |
| O | 73.3 | — | — | — | 44.2 | 42.4 | — |
| P | 73.3 | — | — | — | 47.8 | 47 | — |
| Q | 73.3 | — | — | — | 32.8 | 33.3 | — |
| R | 73.3 | — | — | — | 44.7 | 43.8 | — |
| S | 73.3 | — | — | — | 53.8 | 48.8 | — |
| T | 73.3 | — | — | — | 57.1 | 53.1 | — |

It is noted that the quantity of deposits formed at the exhaust decreases with the reduction in the surface tension of the urea solution to which additives have been added and depends on its additive concentration. Further, as from 500 ppm, the surface tension attains an asymptotic value. For this reason, only concentrations of 500 and 1000 ppm were tested for additives E to T.

EXAMPLE III

The distribution of droplet size in the spray of urea was studied by laser diffraction. The results of this study show that the size distribution measured in the spray is not influenced by the presence of surfactant additive (average equivalent diameter "SMD mid" and diameter "Dv90" measurement).

The invention claimed is:

1. Use of an aqueous solution comprising as a majority part, a constituent capable of releasing gaseous ammonia above 200° C. and as a minority part, at least one multi-functional additive, the HLB of which varies from 7 to 17, for limiting the formation of deposits based on cyanuric acid in SCR spray devices intended for the after-treatment of exhaust gases.

2. Use of a solution according to claim 1, wherein the solution further comprises 15 to 40% of at least one constituent which decomposes to gaseous ammonia and more than 10 ppm, of at least one multi-functional additive.

3. Use of a solution according to claim 1, wherein the solution further comprises 100 to 5000 ppm of at least one multi-functional additive.

4. Use of a solution according to claim 1, wherein the constituent is chosen from urea and its derivatives.

5. Use of a solution according to claim 1, wherein the multi-functional additive is chosen from water-soluble neutral, ionic and amphoteric surfactants.

6. Use of a solution according to claim 1, wherein the additives composed of neutral surfactants are chosen from alkoxylated and polyalkoxylated linear alcohols, alkoxylated and polyalkoxylated alkylphenols, polyalkoxylated fatty acid esters, amine and amide derivatives, alkylene oxide homopolymers and copolymers, alone or in a mixture.

7. Use of a solution according to claim 1, wherein the additives composed of ionic surfactants are chosen from linear alkylamines and alkylammoniums, linear diamines, aromatic or saturated heterocycles containing one or more nitrogen atoms, cyclic compounds of the imidazole type, etheramines and etheramides, oxyamines and ethoxyamines, alone or in a mixture.

8. Use of a solution according to claim 1, wherein the additives composed of amphoteric surfactants are chosen from amino acids and their imide or amide derivatives, alone or in a mixture.

9. Use of a solution according to claim 1, wherein the additives are chosen from polyalkoxylated linear or branched fatty alcohols comprising carbonated chains of 3 to 40 carbon atoms and 5 to 10 alkoxylated units and having an HLB varying from 10 to 15, and polyalkoxylated fatty acid esters comprising 1 to 40 alkoxylated units per ester chain and having an HLB varying from 8 to 14.

10. Use of a solution according to claim 1, wherein the polyalkoxylated alcohols have ethoxylated and/or propoxylated groups.

11. Use of a solution according to claim 1, wherein the polyalkoxylated fatty acid esters are obtained from carbonated-chain C5-C24 fatty acids with polyols comprising 1 to 5 OH, and at least one alkylene oxide.

12. Use of a solution according to claim 1, wherein the polyalkoxylated fatty acid esters are polyalkoxylated glycol and/or glycerol fatty acid esters.

13. Use of a solution according to claim 1, wherein the polyalkoxylated fatty acid esters are polyethoxylated and/or propoxylated fatty acid esters.

14. A SCR process for the after-treatment of exhaust gases comprising vaporization at a temperature comprised between 200 and 400° C. of an aqueous solution comprising as a majority part, a constituent capable of releasing gaseous ammonia above 200° C. and as a minority part, at least one multi-functional additive, the HLB of which varies from 7 to 17.

15. The process according to claim 14, wherein the aqueous solution further comprises 15 to 40% of at least one constituent which decomposes to gaseous ammonia and more than 10 ppm, of at least one multi-functional additive.

16. The process according to claim 14, wherein the multi-functional additive is chosen from water-soluble neutral, ionic and amphoteric surfactants.

17. The process according to claim 14, wherein the additive includes neutral surfactants chosen from alkoxylated and polyalkoxylated linear alcohols, alkoxylated and polyalkoxylated alkylphenols, polyalkoxylated fatty acid esters, amine and amide derivatives, alkylene oxide homopolymers and copolymers, alone or in a mixture.

18. The process according to claim 14, wherein the additive includes ionic surfactants chosen from linear alkylamines and alkylammoniums, linear diamines, aromatic or saturated heterocycles containing one or more nitrogen atoms, cyclic compounds of the imidazole type, etheramines and etheramides, oxyamines and ethoxyamines, alone or in a mixture.

19. The process according to claim 14, wherein the additive includes amphoteric surfactants chosen from amino acids and their imide or amide derivatives, alone or in a mixture.

20. The process according to claim 14, wherein the additive is chosen from polyalkoxylated linear or branched fatty alcohols comprising carbonated chains of 3 to 40 carbon atoms and 5 to 10 alkoxylated units and having an HLB varying from 10 to 15, and polyalkoxylated fatty acid esters comprising 1 to 40 alkoxylated units per ester chain and having an HLB varying from 8 to 14.

21. Use of a solution according to claim 1, wherein the additives composed of neutral surfactants are chosen from ethylene oxide, propylene oxide, alkoxylated polyalcohols, and polyalkoxylated polyalcohols, alone or in a mixture.

22. The process according to claim 14, wherein the additive includes neutral surfactants chosen from ethylene oxide, propylene oxide, alkoxylated polyalcohols, and polyalkoxylated polyalcohols, alone or in a mixture.

* * * * *